Feb. 2, 1954   J. S. VICKERS   2,667,714
ANIMAL TRAP
Filed Aug. 21, 1950   2 Sheets-Sheet 1
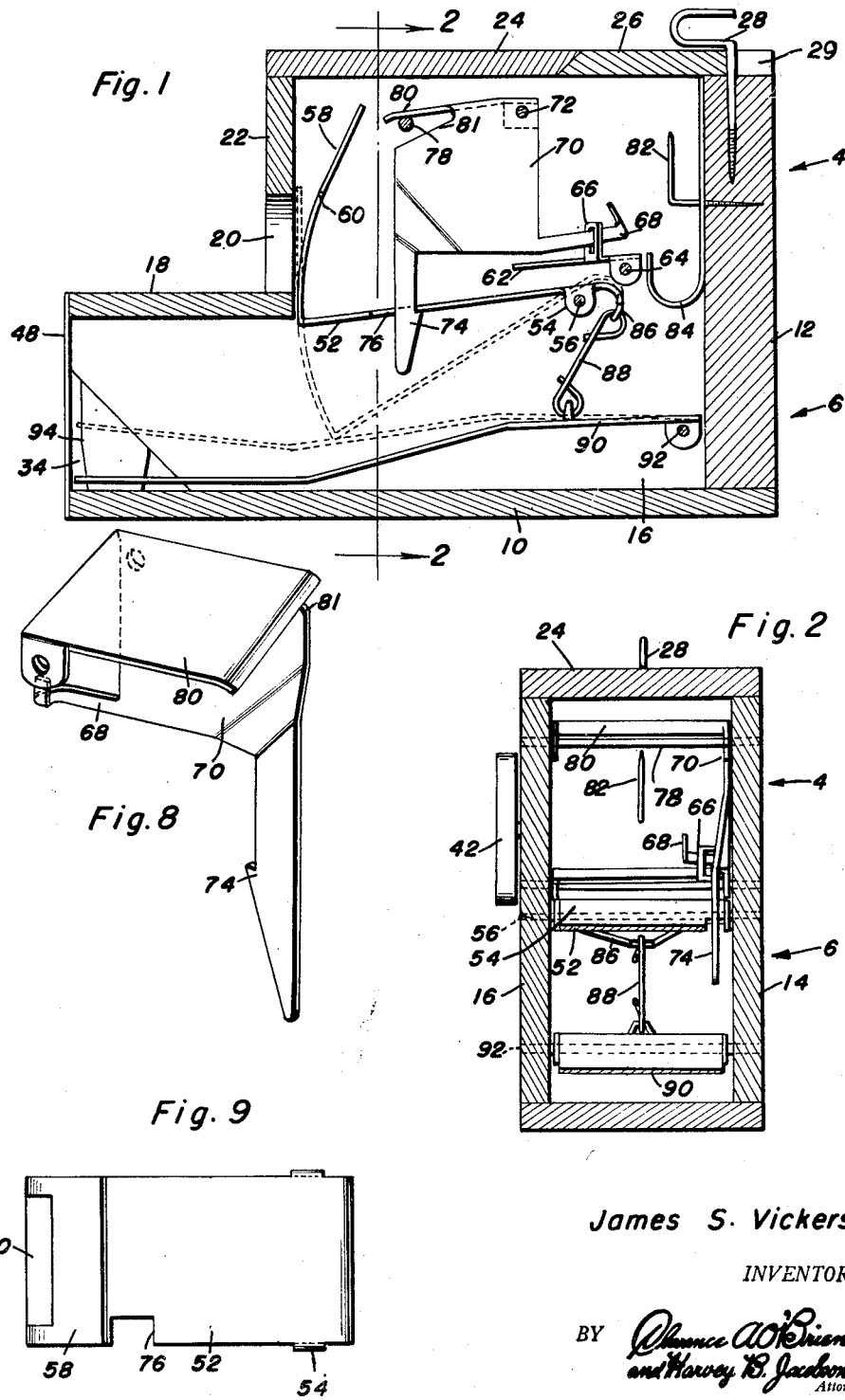
James S. Vickers
INVENTOR.

Feb. 2, 1954   J. S. VICKERS   2,667,714
ANIMAL TRAP
Filed Aug. 21, 1950   2 Sheets-Sheet 2
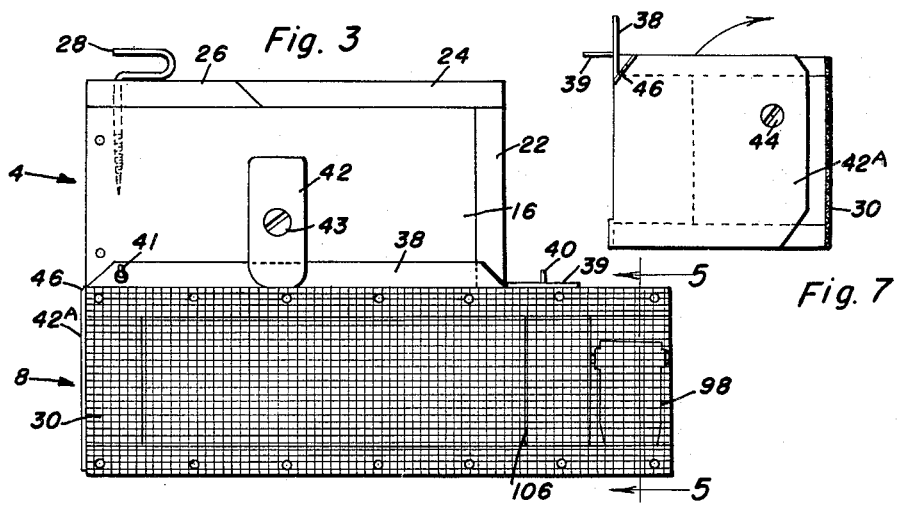
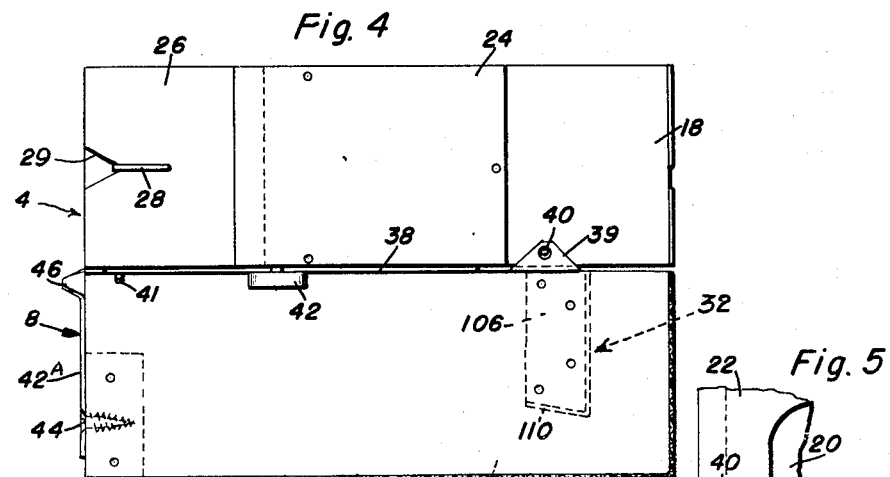
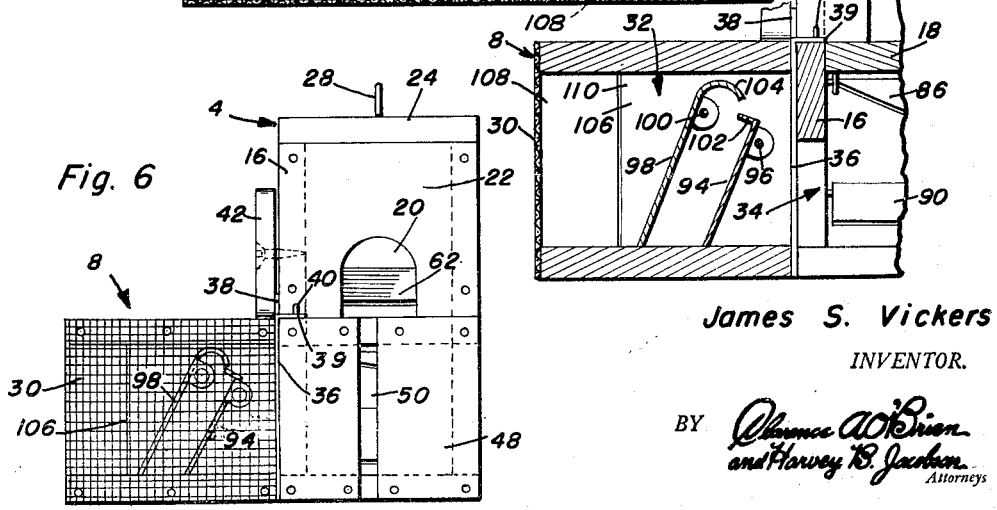
James S. Vickers
INVENTOR.

Patented Feb. 2, 1954

2,667,714

UNITED STATES PATENT OFFICE 2,667,714

ANIMAL TRAP

James S. Vickers, Alexander City, Ala., assignor of fifty per cent to C. V. Vickers, Alexander City, Ala.

Application August 21, 1950, Serial No. 180,591

1 Claim. (Cl. 43—61)

This invention relates to an animal trap and more particularly to a trap for use in catching rats and mice.

A primary object of this invention is to provide a humane trap of the type wherein the animal is lured into the trap and thereafter imprisoned in a portion of the trap.

Another object of this invention is to provide a trap having a prison portion wherein trapped animals are visible to other animals outside the trap, and since these trapped animals are unharmed, the attraction of the trap for still other animals is increased.

Yet another object of this invention is to provide a trap in which the trapped animal re-sets the trap for the next animal.

Yet another object of the invention is to provide a trap in which a prison portion is easily removable from the other portion of the trap, thus facilitating disposition of the trapped animals.

A last object to be mentioned specifically is to provide a device of this character which is relatively inexpensive and practicable to manufacture, which is simple in operation so that the mouse will operate the trap without fail, and which will give generally efficient and durable service.

With these and other objects definitely in view, this invention resides in certain novel features of construction, combination and arrangement of elements and portions as will be hereinafter described in detail in the specification, and particularly pointed out in the appended claim, and illustrated in the accompanying drawings which form a material part of this application, and in which:

Figure 1 is a vertical sectional view through the upper and lower chambers, the view being taken of the structure exposed when one of the walls common to the upper and lower chambers is removed;

Figure 2 is a vertical sectional view, taken on the line 2—2 in Figure 1, the assembly hereinafter referred to as the prison being removed;

Figure 3 is an elevational view of the assembled device, taken from the rear side of the structure shown in Figure 1;

Figure 4 is a top plan view;

Figure 5 is a fragmentary vertical sectional view taken substantially on the line 5—5 in Figure 3;

Figure 6 is an end elevational view of the assembled device, as taken from the left hand end of Figure 3;

Figure 7 is an end view of the prison, taken from the left hand side of Figure 3;

Figure 8 is an enlarged perspective view of the runway-supporting hook and parts integrally connected thereto; and Figure 9 is a top plan view of the runway.

Similar characters of reference designate similar or identical elements and portions throughout the specification and throughout the different views in the drawings.

Referring now to the drawings in detail, this invention includes three main assemblies which may be conveniently referred to as a housing comprising the upper chamber 4, the lower chamber 6 and the prison 8, each of which communicates with each other in a manner which will be described hereinafter. The upper and lower chambers have certain walls thereof in common, and an inspection of Figure 1 will indicate that the base 10 supports an end wall 12 and vertical side walls 14 and 16. The upper chamber 4 is slightly shorter than the lower chamber 6 and a panel which will be referred to as the approach 18 constitutes a horizontal top closure for that portion of the lower chamber extending beyond the upper chamber, and the approach leads to the entrance 20 which is an aperture in the wall 22. Finally, the top is comprised of a fixed panel 24 and a removable panel 26, the latter being held in place to close the corresponding end of the upper chamber by a screw hook 28, the outer arm of the hook comprising a handle whereby the hook may be turned into and out of engagement with the element 26 which is slotted as indicated at 29, it being understood that any suitable locking means may be substituted for this screw hook 28.

The prison 8 is enclosed on two of its vertical sides by reticulated material such as wire screen, indicated at 30, or by glass, in order that other free animals may observe animals trapped in the prison 8 and be lured thereby into investigation of the trap. The entrance into the prison 8 is best indicated at 32 and comprises an alley way communicating with an opening 34 in a lower corner portion of the vertical wall 16, all as clearly indicated in Figure 5. The wall of the prison adjacent the wall 16 is otherwise covered by a metal plate 36 which is extended vertically above the edge of the prison as indicated at 38, a portion of extension 38 being bent horizontally as indicated at 39 and apertured to receive a pin 40 on the approach 18, as possibly best illustrated in Figures 3 and 6. Another pin 41, shown in Figures 3 and 4, extends angularly from the wall 16 to engage another aperture in the outwardly extending portion 38. Further means to secure the prison to the chambers is provided in the turn button 42 which is rotatably mounted on a screw 43 on the wall 16 and engages the upwardly extending portion 38 when turned into one position, and this turn button also prevents the prison from moving upwardly out of engagement with the pins 40 and 41.

A discharge opening is provided in one end of the prison 8 and is closed by a door 42A pivoted on a screw 44 and having a handle 46. It is preferred that this door be of metal material.

It may be here noted that the end of the lower chamber 6 adjacent the approach 18 is closed by a pair of metal plates 48 having a slot 50 therebetween, as indicated best in Figure 6, in order to provide light into the corresponding end of the lower chamber 6, and also to allow access to one end of the pivoted platform 90 which will be discussed in some detail hereinafter.

Having discussed the exterior structure of the trap, the mechanical features thereof will now be set forth in some detail. A runway or platform 52 extends inwardly along the bottom of the upper chamber 4 from the entrance 20, and this runway is provided with depending ears 54 pivoted as indicated at 56 on the vertical walls 14 and 16. The runway has a curved, upwardly extending plate 58 which is provided with an aperture 60, indicated in Figure 9, which registers with the entrance 20 when the runway is in elevated position as indicated in Figure 1. A treadle 62 is pivoted on the transverse pin 64 and is disposed above the inner end of the runway 52, this treadle having an apertured extension 66 which receives an arm 68 of a trigger comprising a side flange 70 which depends from a plate 80 pivoted as indicated at 72 and provided with a hook 74. This hook engages the platform 52 at an edge of the recess 76 in the platform, this recess being best indicated in Figure 9. The hook 74 holds the platform in the position indicated in Figure 1.

A transverse pin 78 is mounted in and between the vertical walls 14 and 16 above the hook 74 and this pin 78 engages the plate 80 to limit the downward pivoting motion of the hook 74, the flange 70 having a recess 81 therein accommodating the pin, the edge portion of the recess 81 engaging the pin 78 to limit the movement of the hook in the opposite direction. This construction assures that the hook 74 will not become misaligned with the recess 76.

A bait-holding hook 82 will be screwed into the end wall 12 above and beyond the treadle 62, and a plate 84 having a curved lower portion will be secured to the end wall 12 between the treadle and the wall 12, the curved lower end closing the space between the treadle and the wall and serving to prevent fragments of bait from falling into the lower chamber 6. The platform is provided with an extending portion which will be referred to as the lever 86, this lever extending beyond the pivot pin 56 towards the end wall 12 and preferably being curved downwardly. The link 88 connects this lever 86 with an intermediate portion of a platform 90 pivoted as indicated at 92 on the vertical walls 14 and 16 and extending longitudinally of the lower chamber 6, the pivotal connection 92 being at that end of the chamber adjacent the treadle 62.

Prison gates are provided in the alley way 32, the outer prison gate 94 being pivoted as indicated at 96 adjacent the exit opening 34 in the side of the lower chamber. The inner gate 98 is pivoted at 100 and the gates are provided with flanges 102 and 104 which engage when an attempt is made to open the inner gate 98 while the outer gate 94 is closed, as will be clearly indicated from an examination of Figure 5. The pivotal connections 96 and 100 of the gates comprise pins extending transversely of the alley way 32 and supported on a partition 106 within the prison 8, it being noted that this partition 106 does not extend the full transverse dimension of the prison and another alley way 108 is provided leading from the alley way 32 to the main compartment of the prison. The partition 106 is preferably covered with a metal shield 110.

The operation of this invention will be clearly understood from a consideration of the foregoing description of the mechanical details thereof, taken in connection with the above recitation of the objects and drawings. In recapitulation, it may be added that the animal entering along the approach 18 through the entrance 20, passes through the opening 60 in the plate 58 and is lured onto the platform 52 by bait hung on the bait hook 82. When the treadle 62 is depressed, the platform 52 swings downwardly so that the plate 58 closes the entrance 20 and the animal slides into the lower compartment and depresses the platform 90 to the position shown in full line in Figure 1. The animal then finds his way through the exit opening 34, past the gates 94 and 98 and into the prison. When the prison is full the same may be detached from the chambers and the animals discharged through the door 42A. Having described the invention, what is claimed as new is:

An animal trap comprising a housing having an entrance opening therein, an animal depressed platform pivotally mounted for vertical swinging movement in the housing adjacent the opening, an animal actuated treadle pivotally mounted in the housing adjacent the platform and including an upstanding apertured ear, a trigger for controlling the platform, said trigger including a substantially horizontal, gravity actuated plate pivotally mounted for vertical swinging movement in the housing above the platform, a depending substantially vertical side flange on said plate, a depending hook on the flange engageable with the platform for releasably securing same in raised position, an arm on the flange engaged for longitudinal sliding movement in the ear for operatively connecting the treadle to the trigger, and a stop pin in the housing engageable with the plate and the flange for limiting swinging movement of the trigger, said flange having a recess therein accommodating said pin.

JAMES S. VICKERS.

References Cited in the file of this patent
UNITED STATES PATENTS

| Number | Name | Date |
|---|---|---|
| 385,421 | McMillan | July 3, 1888 |
| 415,486 | Warnick | Nov. 19, 1889 |
| 1,901,210 | Vickers | Mar. 14, 1933 |
| 2,163,577 | Allen | June 27, 1939 |
| 2,523,624 | Honeycutt | Sept. 26, 1950 |
| 2,555,641 | Goldsmith | June 5, 1951 |